(12) United States Patent
Sim et al.

(10) Patent No.: US 8,950,285 B2
(45) Date of Patent: Feb. 10, 2015

(54) ROBOT JOINT DRIVING METHOD, COMPUTER-READABLE MEDIUM, DEVICE ASSEMBLY AND ROBOT HAVING THE SAME

(75) Inventors: Hyun Sik Sim, Seongnam-si (KR); Soo Sang Yang, Suwon-si (KR); Youn Baek Lee, Suwon-si (KR); Yeon Taek Oh, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 412 days.

(21) Appl. No.: 12/878,809

(22) Filed: Sep. 9, 2010

(65) Prior Publication Data

US 2011/0056321 A1  Mar. 10, 2011

(30) Foreign Application Priority Data

Sep. 9, 2009 (KR) .................. 10-2009-0084795

(51) Int. Cl.
| | | |
|---|---|---|
| B25J 17/00 | (2006.01) | |
| B25J 17/02 | (2006.01) | |
| B25J 18/00 | (2006.01) | |
| B25J 9/10 | (2006.01) | |

(52) U.S. Cl.
CPC ................ *B25J 9/104* (2013.01); *B25J 9/1025* (2013.01); *Y10S 901/27* (2013.01)
USPC .................... 74/490.04; 74/490.01; 901/27

(58) Field of Classification Search
CPC ............. B25J 17/00; B25J 9/00; B25J 9/104; B25J 9/042; B25J 9/102; B25J 9/06; B25J 19/025; B25J 9/1065; B25J 17/0266; B25J 19/0029
USPC ............... 74/490.01, 490.03, 490.04, 490.05, 74/490.06, 89.21, 89.22, 640, 89.2–89.23, 74/501.5, 502.4–502.6; 324/207.2–207.25, 173–174; 901/14, 901/15, 19, 20, 27, 28, 46

See application file for complete search history.

(56) References Cited

U.S. PATENT DOCUMENTS

| | | | | |
|---|---|---|---|---|
| 3,759,302 | A | * | 9/1973 | Attenborough ............... 140/119 |
| 4,492,510 | A | * | 1/1985 | Tanii et al. ..................... 414/733 |
| 4,697,472 | A | * | 10/1987 | Hiyane ...................... 74/490.02 |
| 5,107,716 | A | * | 4/1992 | Torii et al. .................. 74/490.03 |
| 5,180,956 | A | * | 1/1993 | Oaki et al. ............... 318/568.11 |
| 5,221,883 | A | * | 6/1993 | Takenaka et al. ......... 318/568.12 |
| 5,318,471 | A | * | 6/1994 | Glovier ......................... 446/268 |
| 5,455,497 | A | * | 10/1995 | Hirose et al. ............. 318/568.12 |

(Continued)

OTHER PUBLICATIONS

Oriental Motor USA Corp., Harmonic (HG) Gears, 2006, www.orientalmotor.com/newsletter/HG_Geared.htm.*

*Primary Examiner* — Troy Chambers
*Assistant Examiner* — Alexander Vu
(74) *Attorney, Agent, or Firm* — Harness, Dickey & Pierce, P.L.C.

(57) ABSTRACT

Disclosed herein are a robot joint driving method, computer-readable medium, and device assembly which conducts motions similar to those of humans, and a robot having the same. These motions are achieved by arranging joint driving devices suited to characteristics of respective joints. The robot joint driving device assembly includes a tendon-type joint driving device using a wire, and a harmonic drive-type joint driving device using a gear reduction method. The tendon-type joint driving device is used to drive a rotary joint requiring high back-drivability, and the harmonic drive-type joint driving device is used to drive a rotary joint requiring high rigidity and high precision.

7 Claims, 13 Drawing Sheets

(56) References Cited

U.S. PATENT DOCUMENTS

| | | | |
|---|---|---|---|
| 6,431,018 B1 * | 8/2002 | Okada et al. | 74/490.02 |
| 6,580,970 B2 * | 6/2003 | Matsuda et al. | 700/245 |
| 6,634,467 B2 * | 10/2003 | Liu | 188/24.16 |
| 6,805,487 B1 * | 10/2004 | Yuasa et al. | 384/16 |
| 6,897,631 B2 * | 5/2005 | Miyazaki et al. | 318/568.12 |
| 6,991,627 B2 * | 1/2006 | Madhani et al. | 606/1 |
| 7,061,200 B2 * | 6/2006 | Iribe | 318/568.16 |
| 7,281,447 B2 * | 10/2007 | Gosselin et al. | 74/490.04 |
| 7,492,115 B2 * | 2/2009 | Gomi et al. | 318/568.11 |
| 7,510,045 B2 * | 3/2009 | Bareis et al. | 180/444 |
| 7,574,939 B2 * | 8/2009 | Garrec | 74/490.03 |
| 7,628,093 B2 * | 12/2009 | Madhani et al. | 74/490.04 |
| 8,181,552 B2 * | 5/2012 | Lee et al. | 74/490.04 |
| 8,459,139 B2 * | 6/2013 | Lee et al. | 74/490.05 |
| 2004/0074679 A1 * | 4/2004 | Miyazaki et al. | 180/8.1 |
| 2004/0164697 A1 * | 8/2004 | Iribe | 318/568.12 |
| 2005/0204851 A1 * | 9/2005 | Morley et al. | 74/490.01 |
| 2005/0217406 A1 * | 10/2005 | Jiang | 74/490.01 |
| 2006/0117897 A1 * | 6/2006 | Grebenstein | 74/490.05 |
| 2006/0191362 A1 * | 8/2006 | Garrec | 74/89.34 |
| 2006/0201275 A1 * | 9/2006 | Ono | 74/490.01 |
| 2006/0213306 A1 * | 9/2006 | Hayes et al. | 74/490.01 |
| 2007/0210739 A1 * | 9/2007 | Takenaka et al. | 318/568.12 |
| 2007/0295126 A1 * | 12/2007 | Wang | 74/89.35 |
| 2010/0162846 A1 * | 7/2010 | Lee et al. | 74/490.04 |
| 2010/0170357 A1 * | 7/2010 | Kim et al. | 74/89.32 |
| 2011/0056321 A1 * | 3/2011 | Sim et al. | 74/490.04 |
| 2011/0167945 A1 * | 7/2011 | Yang et al. | 74/490.04 |
| 2012/0011956 A1 * | 1/2012 | Lundberg | 74/490.03 |

* cited by examiner

ROBOT JOINT DRIVING METHOD, COMPUTER-READABLE MEDIUM, DEVICE ASSEMBLY AND ROBOT HAVING THE SAME

CROSS-REFERENCE TO RELATED APPLICATIONS

This application claims the benefit of Korean Patent Application No. 2009-84795, filed on Sep. 9, 2009 in the Korean Intellectual Property Office, the disclosure of which is incorporated herein by reference.

BACKGROUND

1. Field

Example embodiments relate to a robot using robot joint driving devices of several types.

2. Description of the Related Art

Robots of various types, i.e., bipedal robots and quadrupedal robots, have been developed for household, military, and industrial purposes.

In particular, humanoid robots, which have a similar body structure to that of humans, are manufactured to conduct motions similar to those of humans.

These humanoid robots conduct various motions including walking motions, such as running, walking, etc., through movements of joints, which are similar to those of humans.

Among joint driving methods, a gear reduction method in which a joint is driven using a motor and a decelerator connected to the motor is generally widely used.

The gear reduction method has advantages including providing high rigidity and high precision in motions. However, the gear reduction method has low back-drivability due to high internal friction.

SUMMARY

Therefore, it is one aspect of the example embodiments to provide a robot joint structure which has high rigidity while conducting similar motions to those of humans, and a robot having the same.

It is a further aspect of the example embodiments to provide a robot joint structure in which joint driving units using different driving methods are used in combination, and a robot having the same.

It is another aspect of the example embodiments to provide a robot joint structure in which a joint driving unit is selected in consideration of characteristics of respective joints, and a robot having the same.

The foregoing and/or other aspects are achieved by providing a robot joint driving device assembly including a frame, a first joint driving device provided at one side of the frame to drive a robot joint unit in a first direction, and a second joint driving device provided at another side of the frame to drive the robot joint unit in a second direction perpendicular to the first direction, wherein the first joint driving device drives the robot joint unit using a wire, and the second joint driving device drives the robot joint unit using a gear reduction method.

The first joint driving device may include a first driving motor movable in regular and reverse directions, a movable member rectilinearly moving according to rotation of the first driving motor, a wire unit connected to both sides of the movable member, an idle pulley rotatably provided at one side of the wire unit, a joint part provided at the other side of the wire unit, and an adjustment unit to adjust tension of the wire unit.

The first joint driving device may further include a ball screw part, to which the movable member is screw-connected.

The ball screw part may be connected with the first driving motor and may be rotated according to driving of the first driving motor.

The movable member may include wire connection parts, to which the wire unit may be connected.

Each of the wire connection parts may include wire passage holes, into which the wire unit is inserted, and wire coupling holes to fix the wire unit to the movable member by coupling pins.

The second joint driving device may include a second driving motor, an input shaft connected to the second driving motor, an oval wave generator connected to the input shaft, a flex spline connected with an output part, having teeth formed on some portions thereof, and installed at the outside of the wave generator, and a circular spline having teeth formed therein to receive the flex spline while engaging with the flex spline.

Each of the first joint driving device and the second joint driving device may include a torque sensor to measure torque applied to each robot joint.

The second joint driving device may further include a rotational angle sensor to measure an angle of rotation of a robot joint.

The foregoing and/or other aspects are achieved by providing a robot joint driving device assembly including a frame, a tendon-type joint driving device provided at one side of the frame to drive a robot joint unit in a first direction using a wire, and a harmonic drive-type joint driving device provided at another side of the frame to drive the robot joint unit in a second direction perpendicular to the first direction using a gear reduction method, wherein the tendon-type joint driving device and the harmonic drive-type joint driving device are used in combination to drive the robot joint unit.

The foregoing and/or other aspects are achieved by providing a robot having a plurality of rotary joints including a tendon-type joint driving device to drive at least one of the plurality of rotary joints using a wire, and a harmonic drive-type joint driving device to drive at least one of the plurality of rotary joints using a gear reduction method, wherein the tendon-type joint driving device is used to drive a rotary joint requiring flexible motion, and the harmonic drive-type joint driving device is used to drive a rotary joint requiring high rigidity and high precision.

The tendon-type joint driving device and the harmonic drive-type joint driving device may be used in combination at a hip joint unit. The tendon-type joint driving device may drive the hip joint unit in the pitch direction, and the harmonic drive-type joint driving device may drive the hip joint unit in the roll direction.

The tendon-type joint driving device and the harmonic drive-type joint driving device may be used in combination at an ankle joint unit. The tendon-type joint driving device may drive the ankle joint unit in the pitch direction, and the harmonic drive-type joint driving device may drive the ankle joint unit in the roll direction.

The tendon-type joint driving device may be used to drive a knee joint unit in the pitch direction.

The foregoing and/or other aspects are achieved by providing a method, including driving a robot joint unit a first direction by a first joint driving device provided at one side of a frame, and driving the robot joint unit in a second direction perpendicular to the first direction by a second joint driving device provided at another side of the frame, wherein the first joint driving device drives the robot joint unit using a wire and the second joint driving device drives the robot joint unit using a gear reduction method.

According to another aspect of one or more embodiments, there is provided at least one computer readable medium including computer readable instructions that control at least one processor to implement methods of one or more embodiments.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout. Embodiments are described below to explain the present disclosure by referring to the figures.

Figure 1:
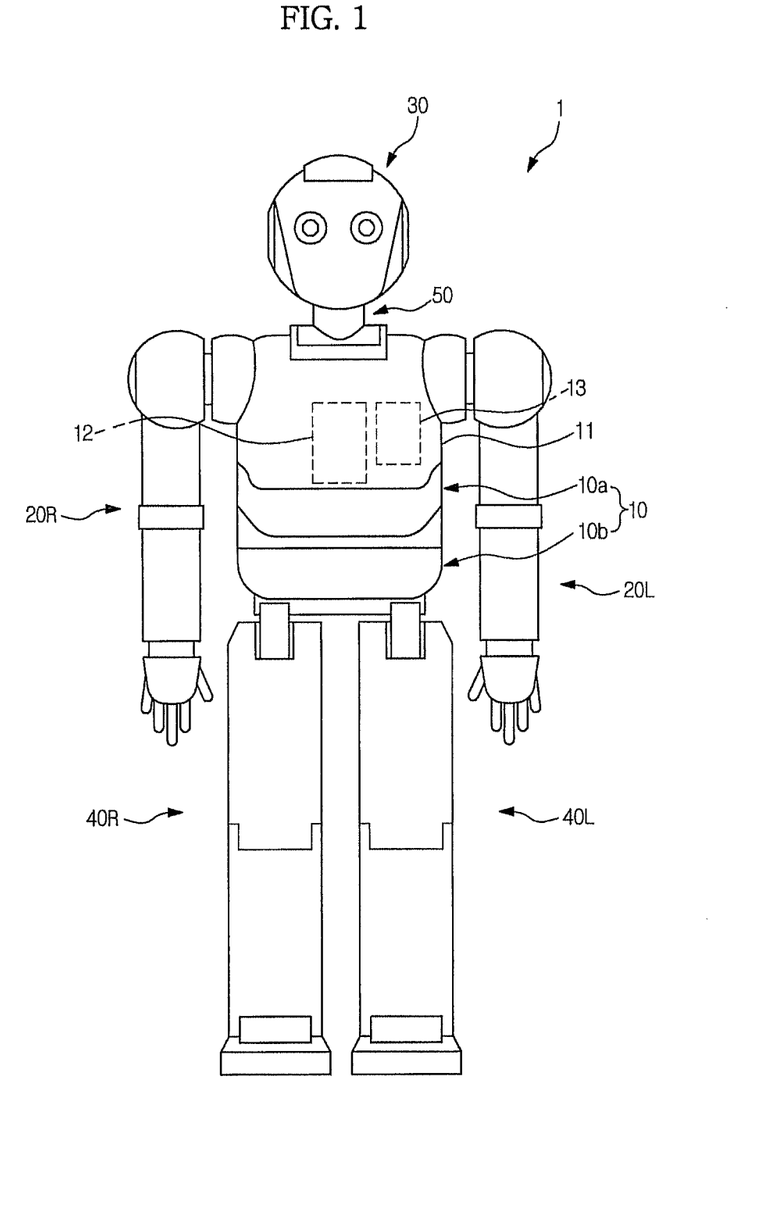
FIG. 1 is a front view illustrating an external appearance of a humanoid robot in accordance with example embodiments.
Figure 2:
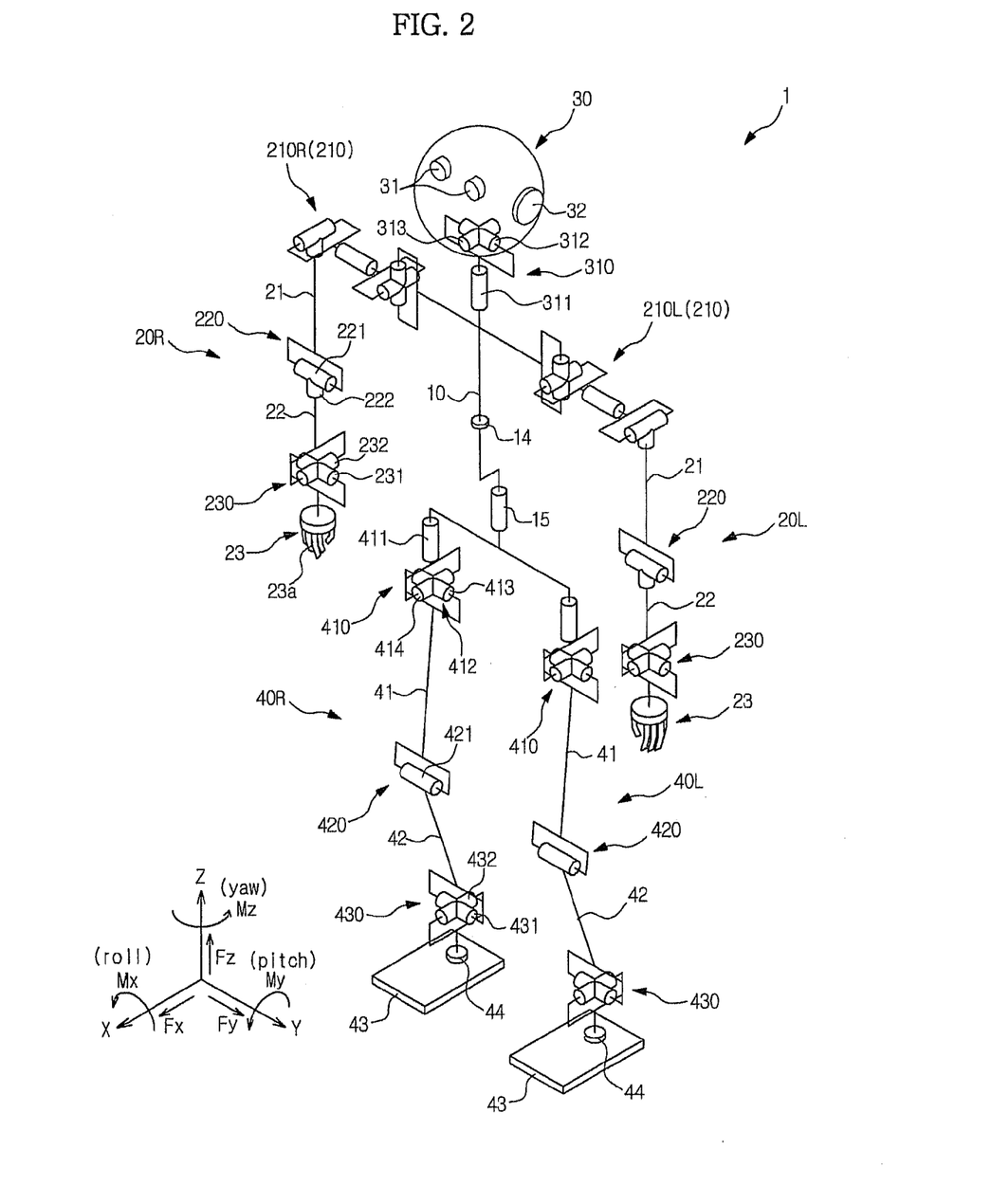
FIG. 2 is a schematic perspective view illustrating a configuration of the humanoid robot of FIG. 1.

FIG. 1 is a front view illustrating an external appearance of a humanoid robot in accordance with example embodiments, and FIG. 2 is a schematic perspective view illustrating a configuration of the humanoid robot of FIG. 1.

As shown in FIGS. 1 and 2, a humanoid robot (hereinafter, simply referred to as a 'robot') 1 includes a torso 10, arms 20R and 20L connected to both sides of the upper portion of the torso 10, a head 30 connected to the upper end of the torso 10, and legs 40R and 40L connected to both sides of the lower portion of the torso 10. Both arms 20R and 20L are respectively connected to the torso 10 through shoulder joint assemblies 210R and 210L, and the head 30 is connected to the torso 10 through a neck 50. Here, R and L respectively represent a right side and a left side.

The inside of the torso 10 is protected by a cover 11. A control unit 12, a battery 13, and an inclination sensor 14 may be installed in the torso 10. The inclination sensor 14 detects an angle of inclination of the torso 10 relative to a vertical axis and its angular velocity.

The torso 10 is divided into a breast part 10a and a waist part 10b, and a joint 15 causing the breast part 10a to be rotated relative to the waist part 10b is installed between the breast part 10a and the waist part 10b. FIG. 2 briefly illustrates the torso 10 as a torso link.

Both arms 20R and 20L respectively include upper arm links 21, lower arm links 22, and hands 23. The upper arm links 21 are connected to the torso 10 through the shoulder joint assemblies 210. The upper arm links 21 and the lower arm links 22 are connected to each other through elbow joint units 220, and the lower arm links 22 and the hands 23 are connected to each other through wrist joint units 230.

The elbow joint units 220 respectively include rotary joints 221 rotated in a pitch direction and rotary joints 222 rotated in a yaw direction, and thus have two degrees of freedom. The wrist joint units 230 include rotary joints 231 rotated in the pitch direction and rotary joints 232 rotated in a roll direction, and thus have two degrees of freedom.

Five fingers 23a are installed at each of the hands 23. Plural joints (not shown), respectively driven by motors, may be installed on each of the fingers 23a. The fingers 23a perform various motions, such as gripping of an object and indicating of a special direction, in connection with the motion of the arms 20R and 20L.

The shoulder joint assemblies 210R and 210L are mounted at both sides of the torso 10, and connect both arms 20R and 20L to the torso 10. The two shoulder joint assemblies 210R and 210L are disposed between the torso 10 and the arms 20R and 20L of the robot 1, and allow the arms 20R and 20L to move.

Cameras 31 serving as the sense of sight of the robot 1 and microphones 32 serving as the sense of hearing of the robot 1 are connected to the head 30.

The head 30 is connected to the torso 10 through a neck joint unit 310. The neck joint unit 310 includes a rotary joint 311 rotated in the yaw direction, a rotary joint 312 rotated in the pitch direction, and a rotary joint 313 rotated in the roll direction, and thus has three degrees of freedom.

Head rotating motors (not shown) are respectively connected to the respective rotary joints 311, 312, and 313 of the neck joint unit 310. The control unit 12 controls the respective motors and thus drives the rotary joints 311, 312, and 313 at proper angles, thereby allowing the head 40 to move in a desired direction.

Both legs 40R and 40L respectively include thigh links 41, calf links 42, and feet 43. The thigh links 41 are connected to the torso 10 through thigh joint units 410. The thigh links 41 and the calf links 42 are connected to each other by knee joint units 420, and the calf links 42 and the feet 43 are connected to each other by ankle joint units 430.

The thigh joint units 410 respectively have three degrees of freedom. In particular, the thigh joint units 410 respectively include rotary joints 411 rotated in the yaw direction (around the Z-axis), rotary joints 413 rotated in the pitch direction (around the Y-axis), and rotary joints 414 rotated in the roll direction (around the X-axis). Among the thigh joint units 410, the rotary joints 413 rotated in the pitch direction and the rotary joints 414 rotated in the roll direction may form hip joint units 412.

The knee joint units 420 respectively include rotary joints 421 rotated in the pitch direction, and thus have one degree of freedom. The ankle joint units 430 respectively include rotary joints 431 rotated in the pitch direction and rotary joints 432 rotated in the roll direction, and thus have two degrees of freedom.

Since the legs 40R and 40L respectively include six rotary joints for three joint units 410, 420, and 430, a total of twelve rotary joints is provided for the two legs 40R and 40L. Although not shown in the drawings, motors to drive the rotary joints are respectively installed on the legs 40R and 40L. The control unit 12 properly controls the motors provided on the legs 40R and 40L, thereby achieving various motions of the legs 40R and 40L including walking of the robot 1.

Multi-axis force and torque (F/T) sensors 44 are respectively installed between the feet 43 and the ankle joint units 430 of the two legs 40R and 40L. The multi-axis F/T sensors 44 measure three directional components (Mx, My, Mz) of moment and three directional components (Fx, Fy, Fz) of force transmitted from the feet 43, and detect whether or not the feet 43 are planted on the ground or loads are applied to the feet 43.

Hereinafter, a robot joint driving device assembly 500 used in at least one of the several joint units of the robot will be described.

Figure 3A:
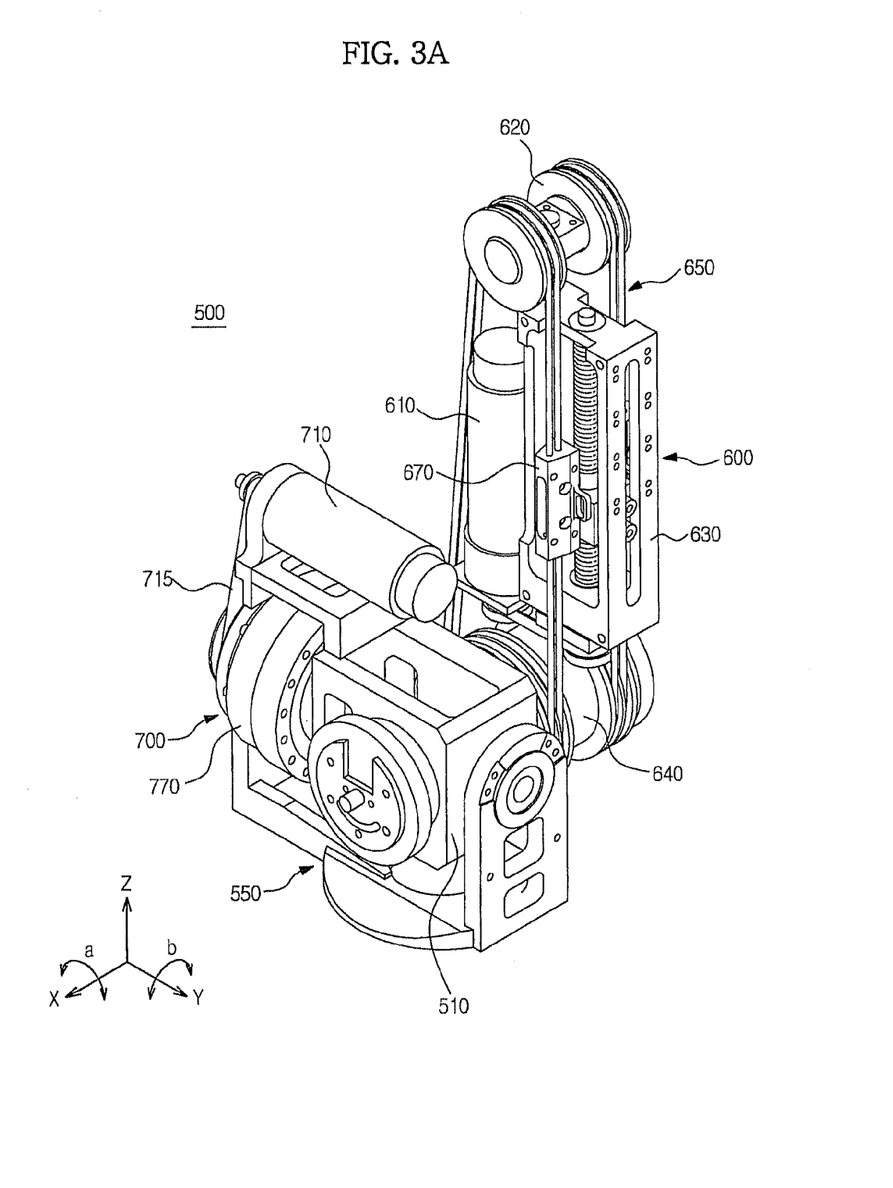
FIG. 3A is a perspective view illustrating an external appearance of a robot joint driving device assembly.
Figure 3B:
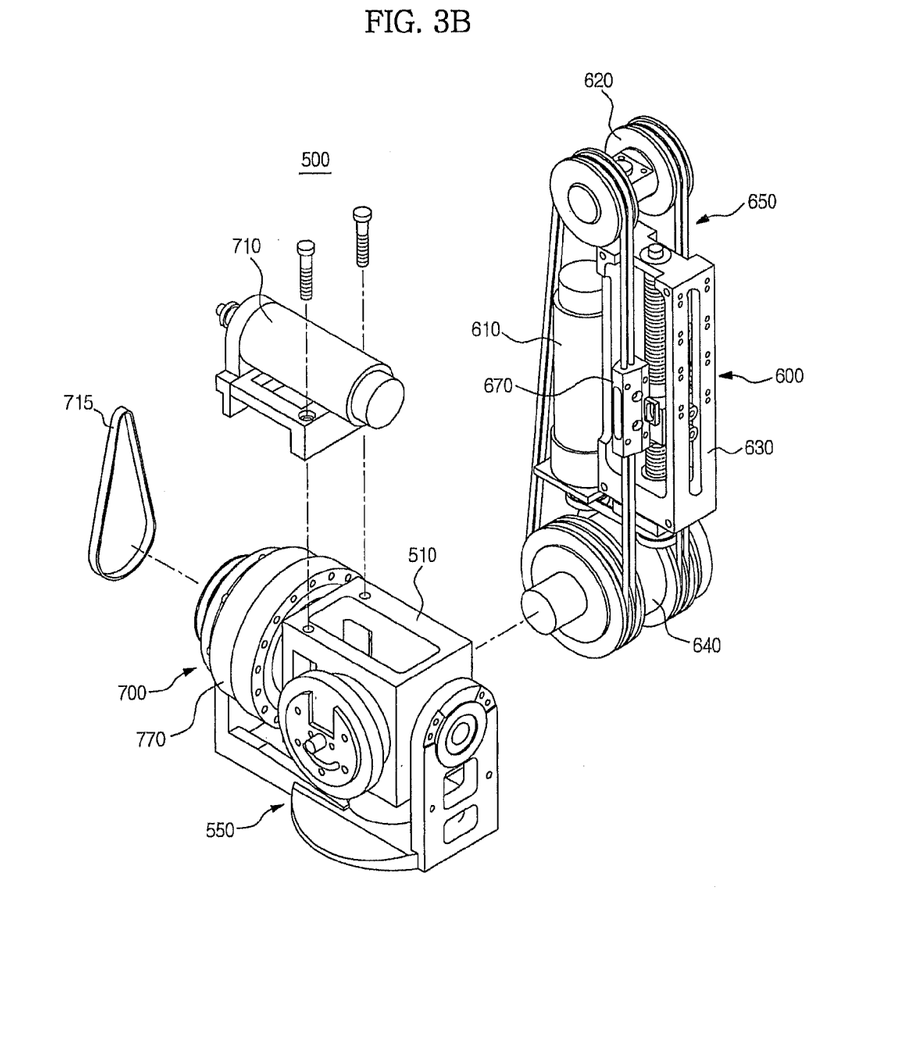
FIG. 3B is an exploded perspective view of the robot joint driving device assembly of FIG. 3A.
Figure 3C:
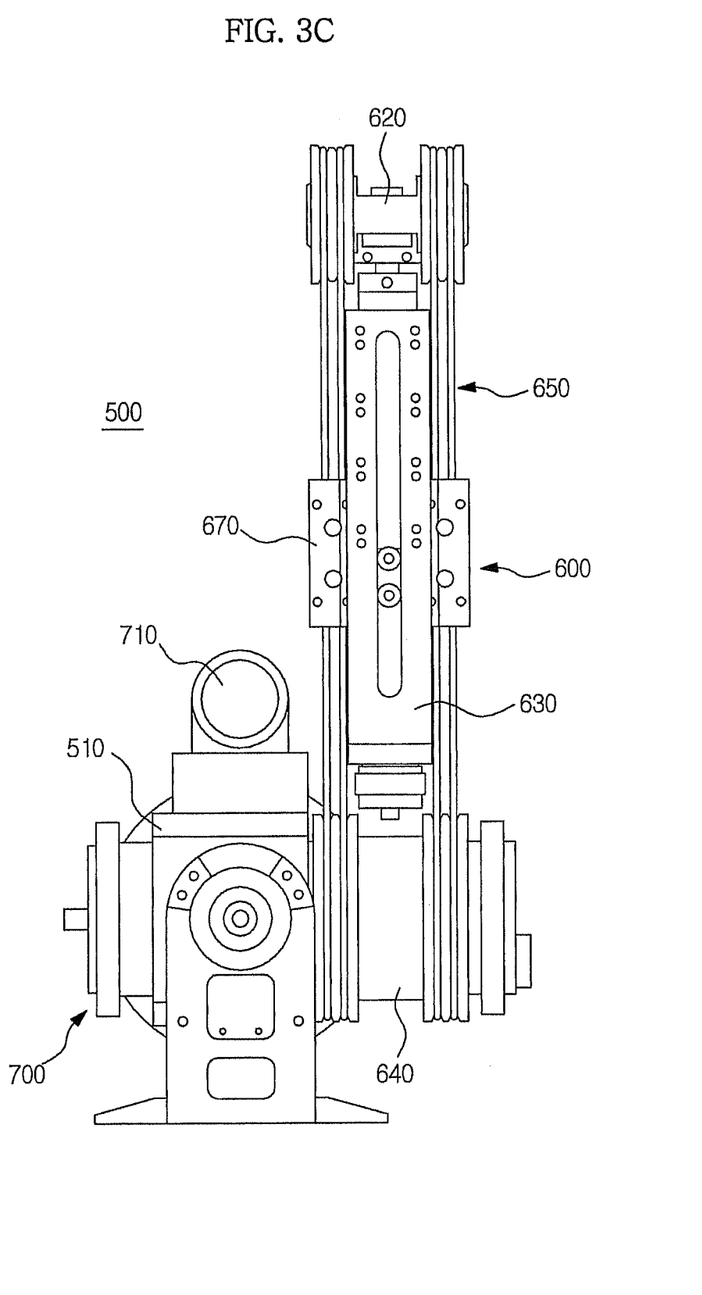
FIG. 3C is a front view of the robot joint driving device assembly of FIG. 3A.
Figure 3D:
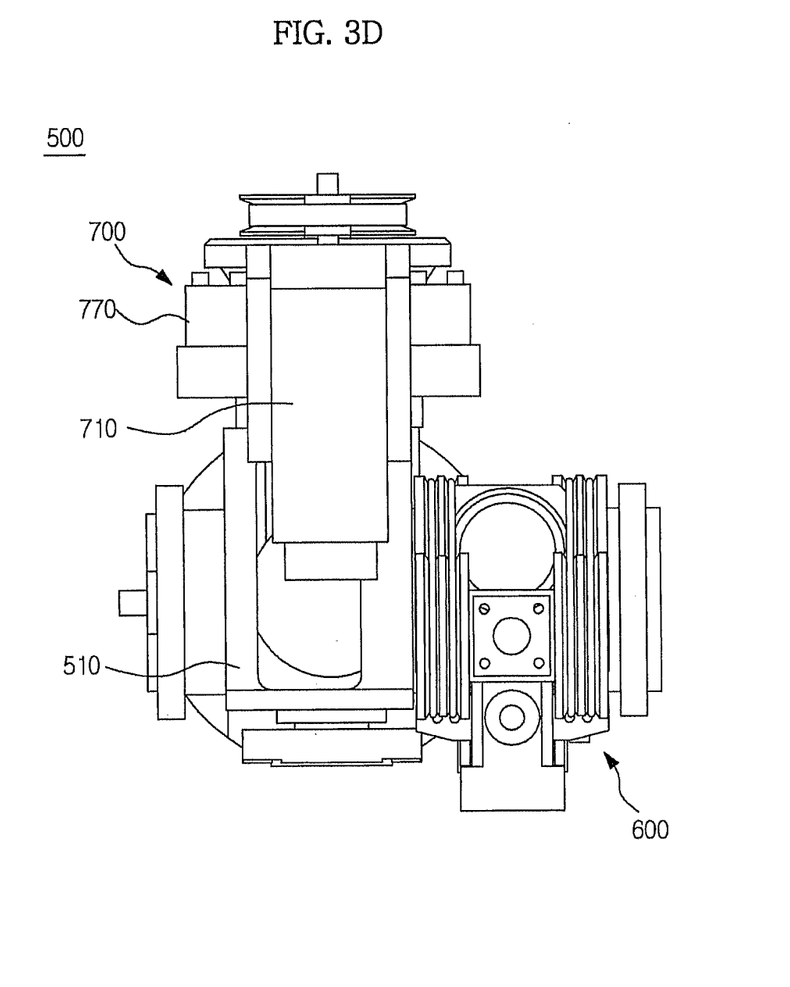
FIG. 3D is a plan view of the robot joint driving device assembly of FIG. 3A.
Figure 3E:
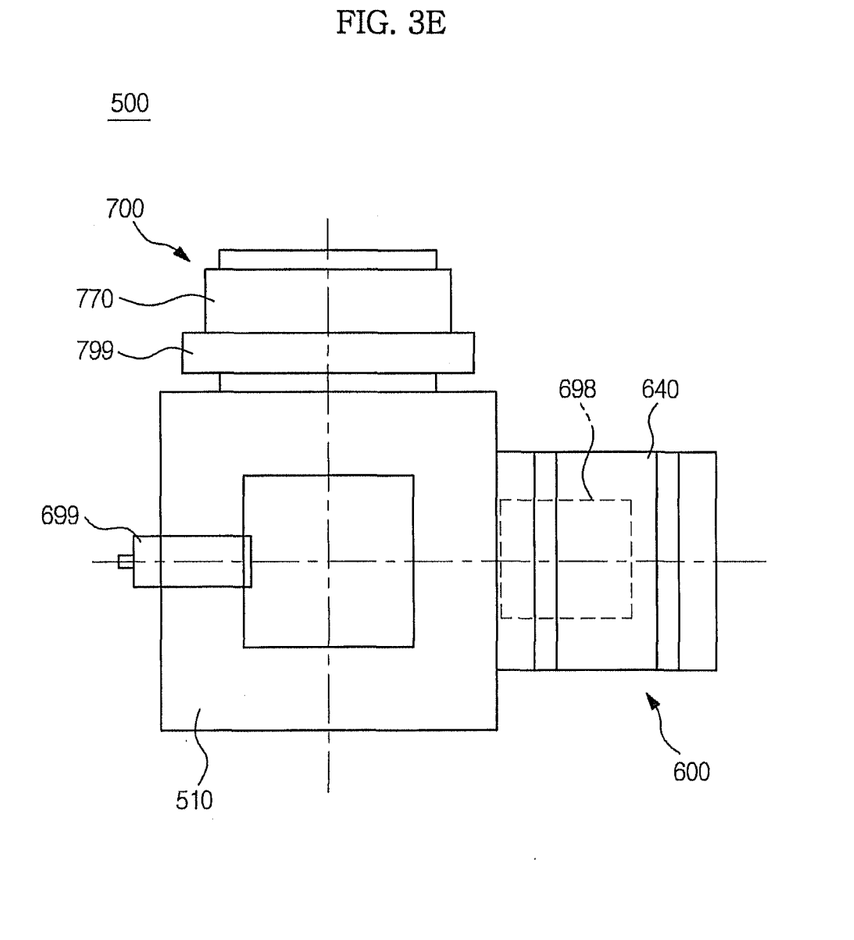
FIG. 3E is a schematic view illustrating a structure of FIG. 3D.
Figure 4:
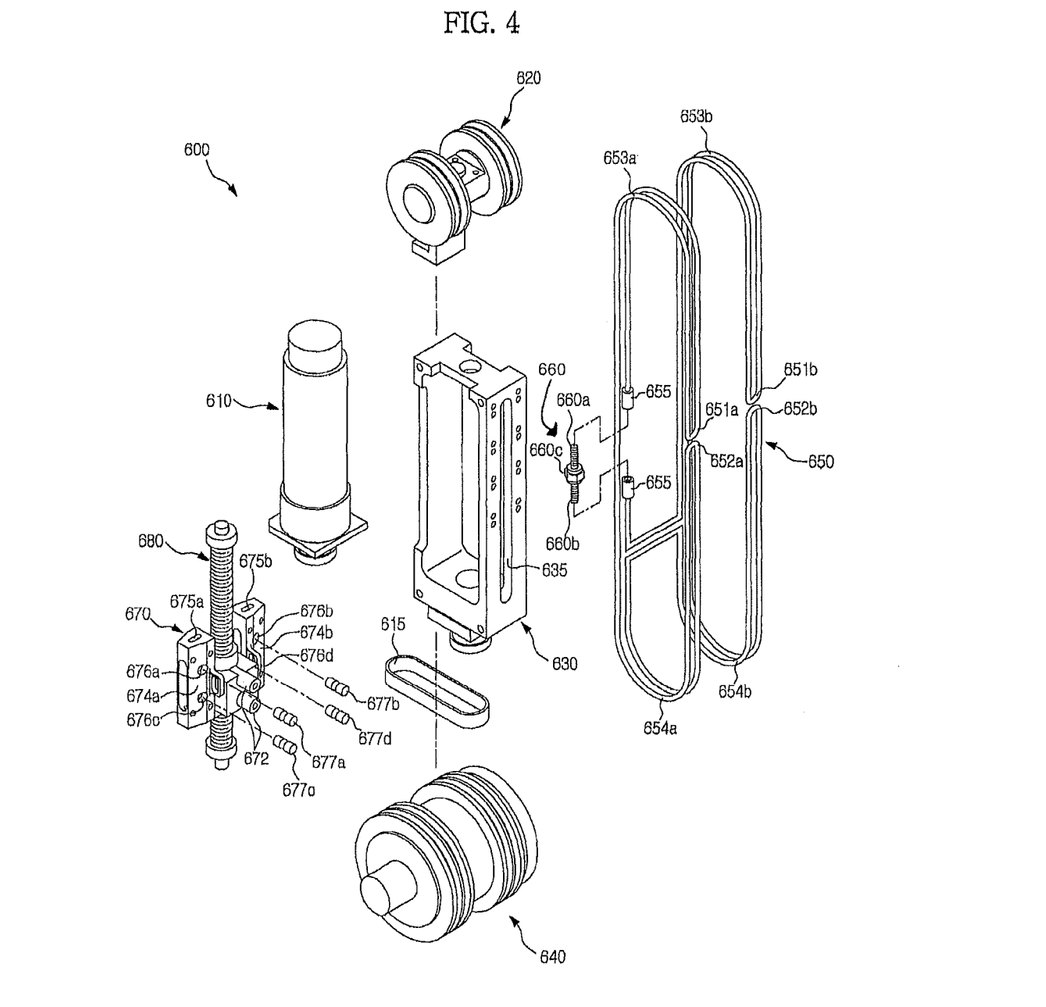
FIG. 4 is an exploded perspective view of a first joint driving device.
Figure 5:
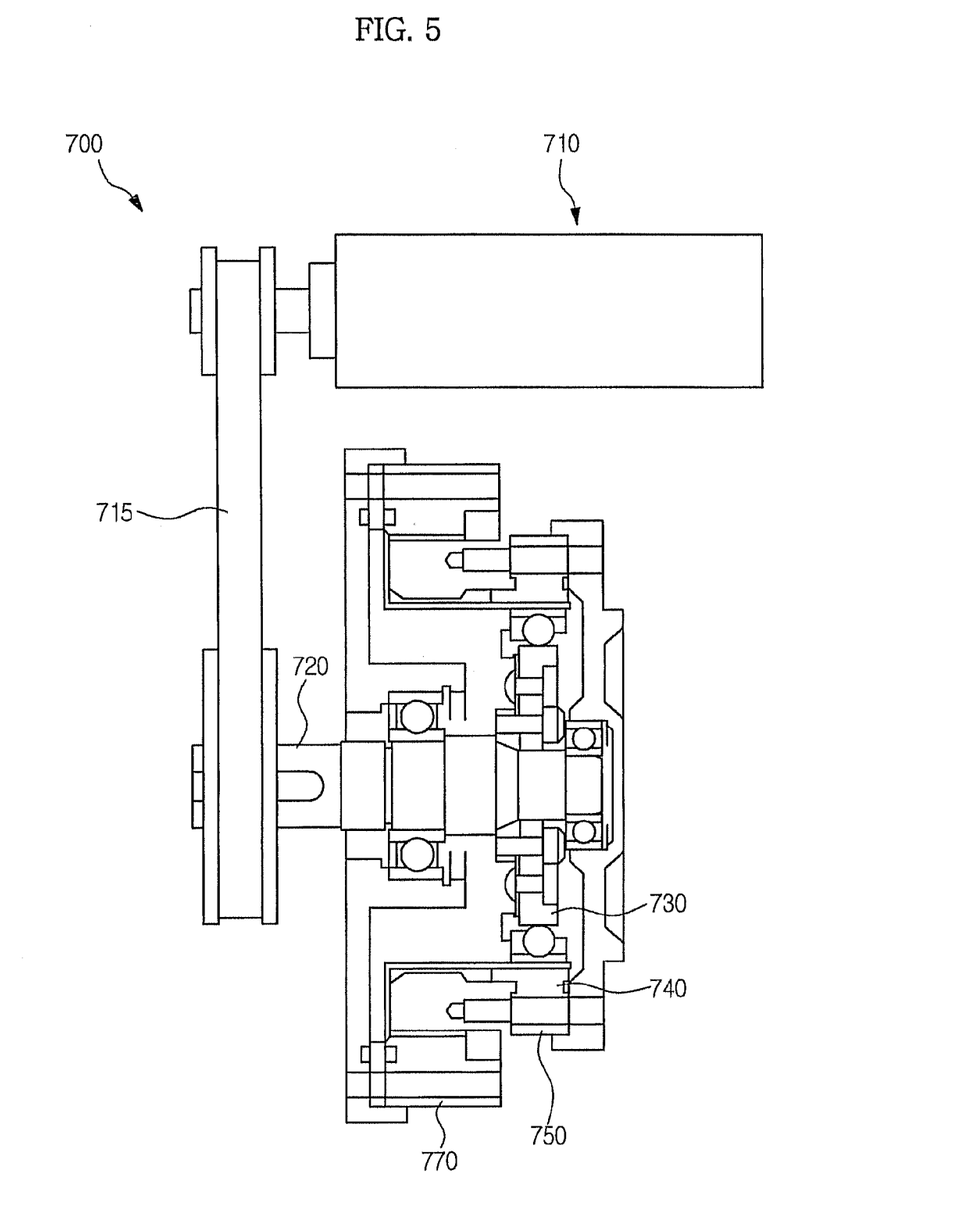
FIG. 5 is a longitudinal-sectional view of a second joint driving device.

FIG. 3A is a perspective view illustrating an external appearance of the robot joint driving device assembly. FIG. 3B is an exploded perspective view of the robot joint driving device assembly of FIG. 3A. FIG. 3C is a front view of the robot joint driving device assembly of FIG. 3A. FIG. 3D is a plan view of the robot joint driving device of FIG. 3A. FIG. 3E is a schematic view illustrating a structure of FIG. 3D. FIG. 4 is an exploded perspective view of a first joint driving device. FIG. 5 is a longitudinal-sectional view of a second joint driving device.

As shown in FIGS. 3A to 3E, the robot joint driving device assembly 500 includes a frame 510, a first joint driving device 600 provided at one side of the frame 510 to drive a robot joint part 550 in a first direction (a), and a second joint driving device 700 provided at the other side of the frame 510 to drive the robot joint part 550 in a second direction (b) perpendicular to the first direction (a).

The robot joint driving device assembly 500 rotatably drives the robot joint part 550 in two directions, i.e. the first direction (a) and the second direction (b). The first joint driving device 600 controls the driving of the robot joint part 550 in the first direction (a), and the second joint driving device 700 controls the driving of the robot joint part 550 in the second direction (b).

A detailed description of the first joint driving device 600 and the second joint driving device 700 will be given later.

As shown in FIG. 3E, a first torque sensor 698 to measure torque transmitted to a robot joint part 640 in the first direction (a) is installed in the robot joint part 640 of the first joint driving device 600. Further, a rotational angle sensor 699 to measure a degree of rotation of the robot joint part 640 in the first direction (a) is installed in the frame 510 opposite to the robot joint part 640.

A second torque sensor 799 to measure torque transmitted to an output part 770 of the second joint driving device 700 in the second direction (b) is installed between the second joint driving device 700 and the frame 510.

With reference to FIG. 4, the first joint driving device 600 includes a first driving motor 610 moving in regular and reverse directions, a ball screw part 680 connected with the first driving motor 610 and rotated, a movable member 670 rectilinearly moving according to rotation of the ball screw part 680, a wire unit 650 connected with both sides of the movable member 670, an idle pulley 620 rotatably disposed at a designated side of the wire unit 650, the robot joint part 640 rotatably arranged at the other side of the wire unit 650, and an adjustment unit 660 to adjust tension of the wire unit 650.

The first driving motor 610 moves in regular and reverse directions, and is attached to one side of a guide frame 630. The first driving motor 610 is connected to the ball screw part 680 by a belt 615, and transmits rotary force to the ball screw part 680 by the belt 615.

The ball screw part 680 serves to transmit the rotary force of the first driving motor 610 to the movable member 670, and is screw-connected with the movable member 670.

The movable member 670 rectilinearly moves up and down, and serves to transmit the force of the first driving motor 610 to the wire unit 650.

The movable member 670 includes wire connection parts 674a and 674b formed at both sides thereof such that the wire unit 650 is connected to the wire connection parts 674a and 674b. The wire connection parts 674a and 674b include wire passage holes 675a and 675b, into which the wire unit 650 is inserted, and wire coupling holes 676a, 676b, 676c, and 676d, to which the wire unit 650 is fixed by coupling pins 677a, 677b, 677c, and 677d.

The wire unit 650 inserted into the wire passage holes 675a and 675b is fixed to the movable member 670 by the coupling pins 677a, 677b, 677c, and 677d connected to the wire coupling holes 676a, 676b, 676c, and 676c.

That is, first ends 651a and 651b of the wire unit 650 at one side are inserted into the wire passage holes 675a and 675b formed on the upper portion of the movable member 670 and are fixed to the movable member 670 by coupling the coupling pins 677a and 677b with the upper wire coupling holes 676a and 676b, and second ends 652a and 652b of the wire unit 650 at the other side are inserted into the wire passage holes (not shown) formed on the lower portion of the movable member 670 and are fixed to the movable member 670 by coupling the coupling pins 677c and 677d with the lower wire coupling holes 676c and 676d.

Movable member guides 672 protrude forward from the front surface of the central portion of the movable member 670. The movable member guides 672 serve to induce up and down rectilinear motion of the movable member 670, are inserted into a guide rail 635 formed at the central portion of the guide frame 630 and move up and down along the guide rail 635.

The wire unit 650 is connected to the idle pulley 620 and the robot joint part 640 while maintaining a designated tension. The wire unit 650 is preferably made of steel, and surrounds the disc-shaped idle pulley 620 and robot joint part 640.

The wire unit 650 is connected to the adjustment unit 660 to maintain a designated tension. The adjustment unit 660 includes a right-hand thread part 660a at one end thereof, and a left-hand thread part 660b at the other end thereof. The right-hand thread part 660a and the left-hand thread part 660b are received in female screws 655 provided on the wire unit 650.

The right-hand thread 660a and the left-hand thread 660b of the adjustment unit 660 are rotated in a clockwise direction or a counterclockwise direction by an adjustment part 660c, and the tension of the wire unit 650 may be adjusted by varying the relative length of the wires 650 surrounding the idle pulley 620 and the robot joint part 640 according to the rotation of the right-hand thread 660a or the left-hand thread 660b.

The wire unit 650 may be assembled such that two pairs of strands, i.e., a total of four strands, are arranged when the wire unit 650 is connected to the right-hand thread part 660a and the left-hand thread part 660b of the adjustment unit 660. Further, the wire unit 650 is installed to surround the upper portion of the circumference of the idle pulley 620 and the lower portion of the circumference of the robot joint part 640.

Portions 654a and 654b of the wire unit 650 are wound on the robot joint part 640 so that the robot joint part 640 receives driving force transmitted from the first driving motor 610. Other portions 653a and 653b of the wire unit 650 are wound on the idle pulley 620 separately installed to adjust the tension of the wire unit 650.

The above first joint driving device 600 is a joint driving device which drives the robot joint part 640 using the wire unit 650, i.e., a tendon-type joint driving device.

The tendon-type joint driving device has excellent back-drivability, and thus achieves safe and flexible driving of a joint. That is, the tendon-type joint driving device has excellent back-drivability and assures flexible motion.

With reference to FIG. 5, the second joint driving device 700 includes a second driving motor 710 provided movably in regular and reverse directions, an input shaft 720 connected to the second driving motor 710, an oval wave generator 730 connected to the input shaft 720, a flex spline 740 connected with an output part 770, having teeth formed on some portions thereof, and installed at the outside of the wave generator 730, and a circular spline 750 having teeth formed therein to receive the flex spline 740 while engaging with the flex spline 740. Reference numeral 715 is a belt connecting the second driving motor 710 and the input shaft 720. Rotary force of the second driving motor 710 is transmitted to the output part 770 in a decelerated state via the input shaft 720, the wave generator 730, the flex spline 740, and the circular spline 750, and the output part 770 is rotated as one of robot joint units.

The second joint driving device 700 is a conventional harmonic drive-type joint driving device using a gear reduction method, and a detailed description thereof will be omitted.

The above second joint driving device 700 has a small size and high rigidity, and achieves fine motion.

As described above, the first joint driving device 600 has excellent back-drivability and achieves safe and flexible joint motion, and the second joint driving device 700 has high rigidity and achieves fine joint motion.

Therefore, purposes and required motions of respective joint units of the robot 1 are analyzed, and the robot joint driving device assembly 500 is arranged such that a joint requiring high back-drivability is driven by the tendon-type first joint driving device 600, and a joint requiring fine motion and high rigidity is driven by the harmonic drive-type second joint driving device 700.

A joint requiring high back-drivability is arranged in the first direction (a) in which the first joint driving device 600 is driven, and a joint requiring fine motion and high rigidity is arranged in the second direction (b) in which the second joint driving device 700 is driven.

Figure 6:
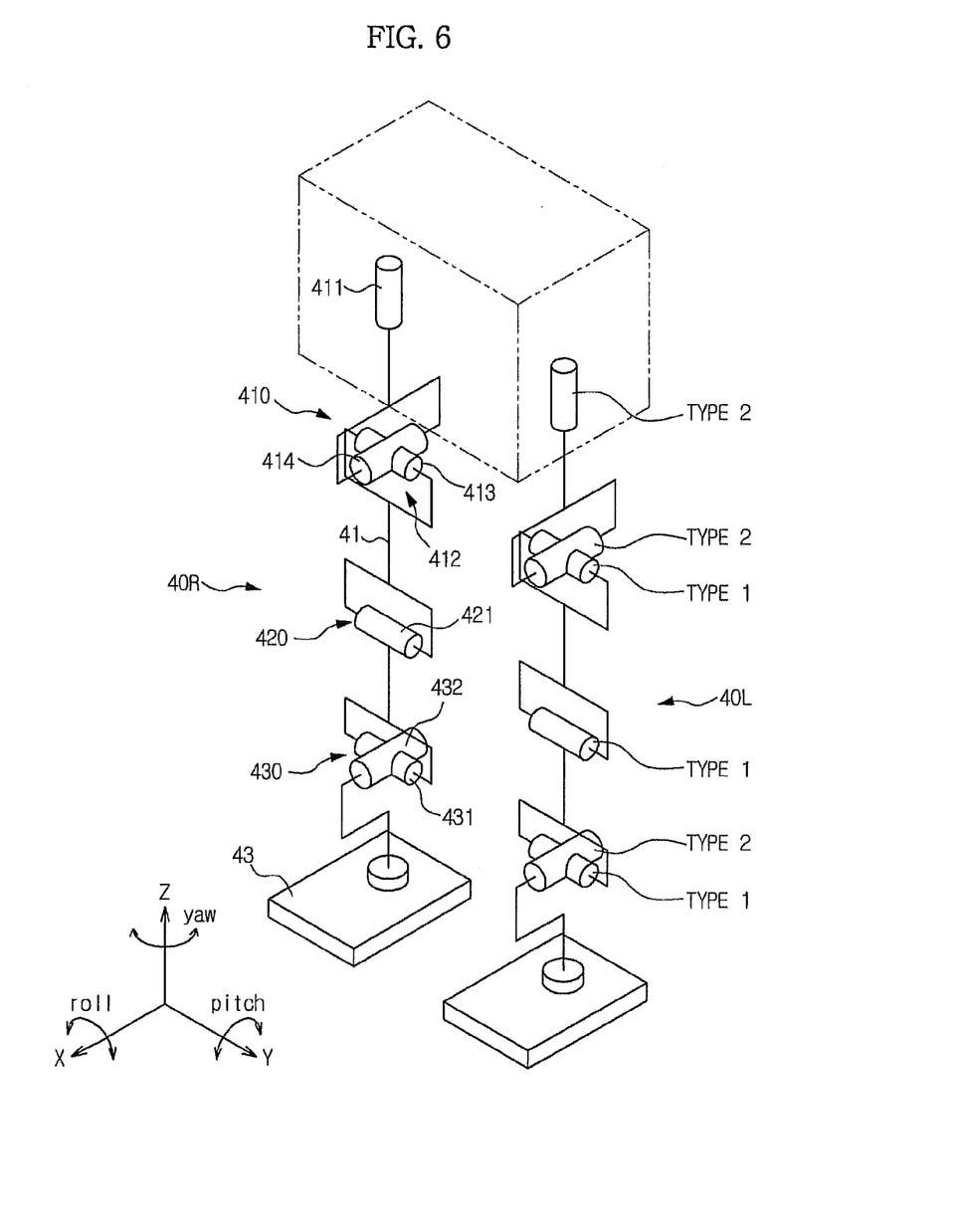
FIG. 6 is a schematic view illustrating arrangement of joint driving device assemblies applied to both legs of the robot.

FIG. 6 is a schematic view illustrating arrangement of joint driving device assemblies applied to both legs of the robot.

Detailed arrangement of joint driving devices at both legs 40R and 40L of the robot 1 is shown in FIG. 6. In FIG. 6, "TYPE 1" denotes the tendon-type first joint driving device 600, and "TYPE 2" denotes the harmonic drive-type second joint driving device 700.

The rotary joint 413 rotated in the pitch direction (around the Y-axis) and the rotary joint 414 rotated in the roll direction (around the X-axis) of the hip joint unit 412 are driven by the above-described robot joint driving device assembly 500, the rotary joint 431 rotated in the pitch direction (around the Y-axis) and the rotary joint 432 rotated in the roll direction (around the X-axis) of the ankle joint unit 430 are driven by the above-described robot joint driving device assembly 500, the rotary joint 411 rotated in the yaw direction (around the Z-axis) is driven by the conventional harmonic drive-type joint driving device, and the rotary joint 421 of the knee joint unit 420 is driven by the first joint driving device 600.

Hereinafter, driving structures of the hip joint unit 412 and the knee joint unit 420 will be described.

Figure 7A:
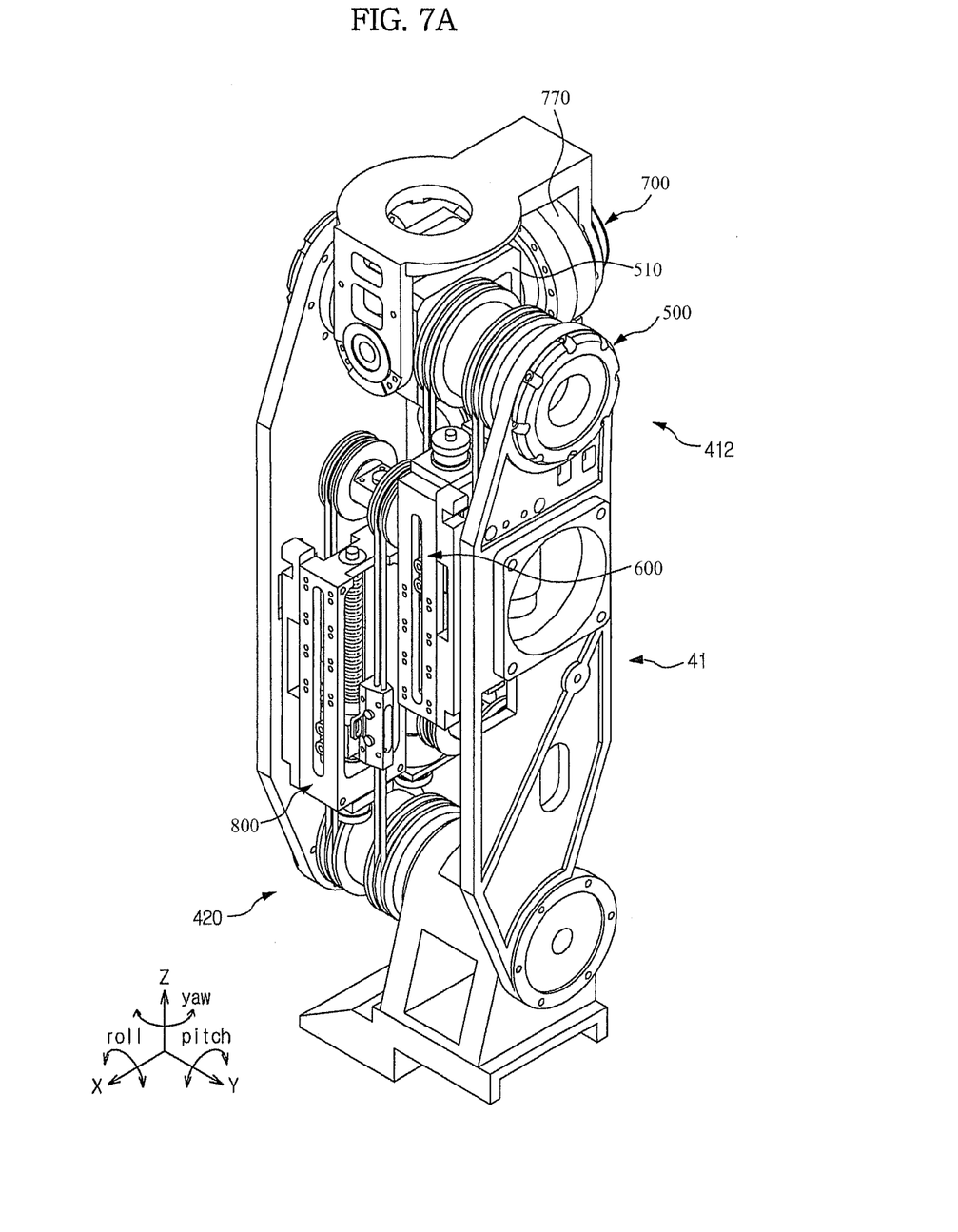
FIG. 7A is a perspective view illustrating a hip joint unit and a knee joint unit.
Figure 7B:
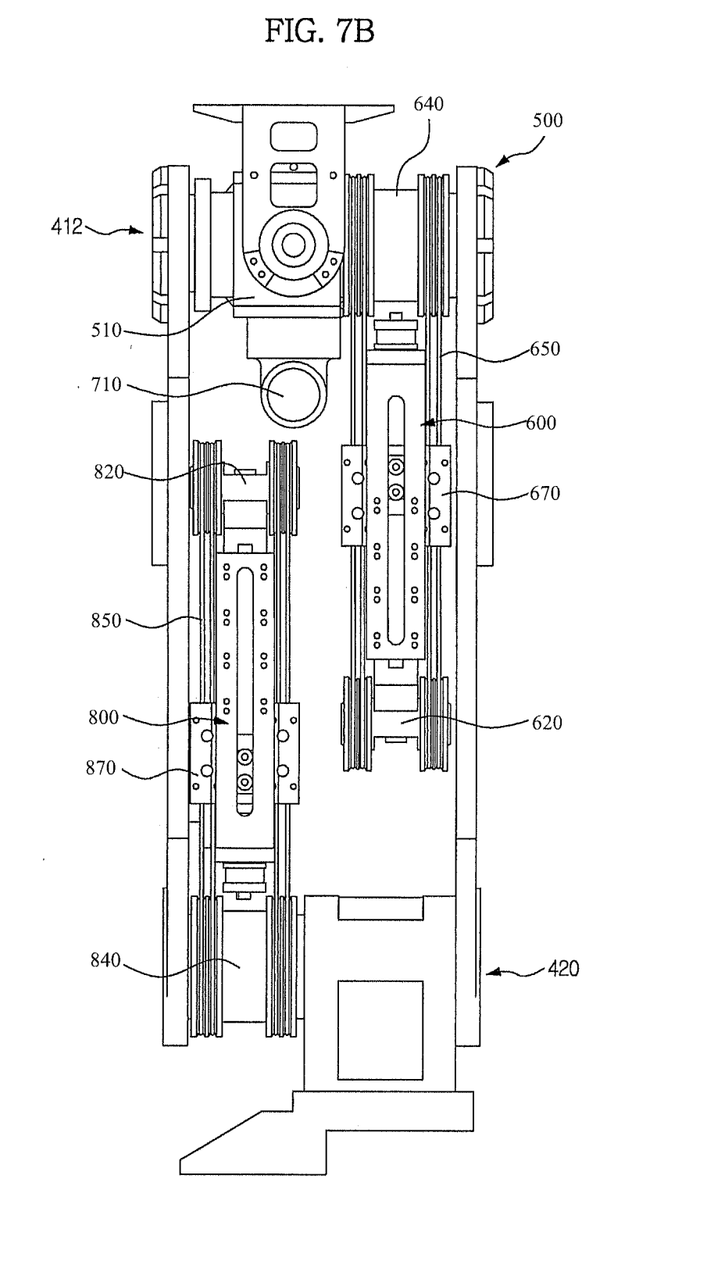
FIG. 7B is a front view of FIG. 7A.
Figure 7C:
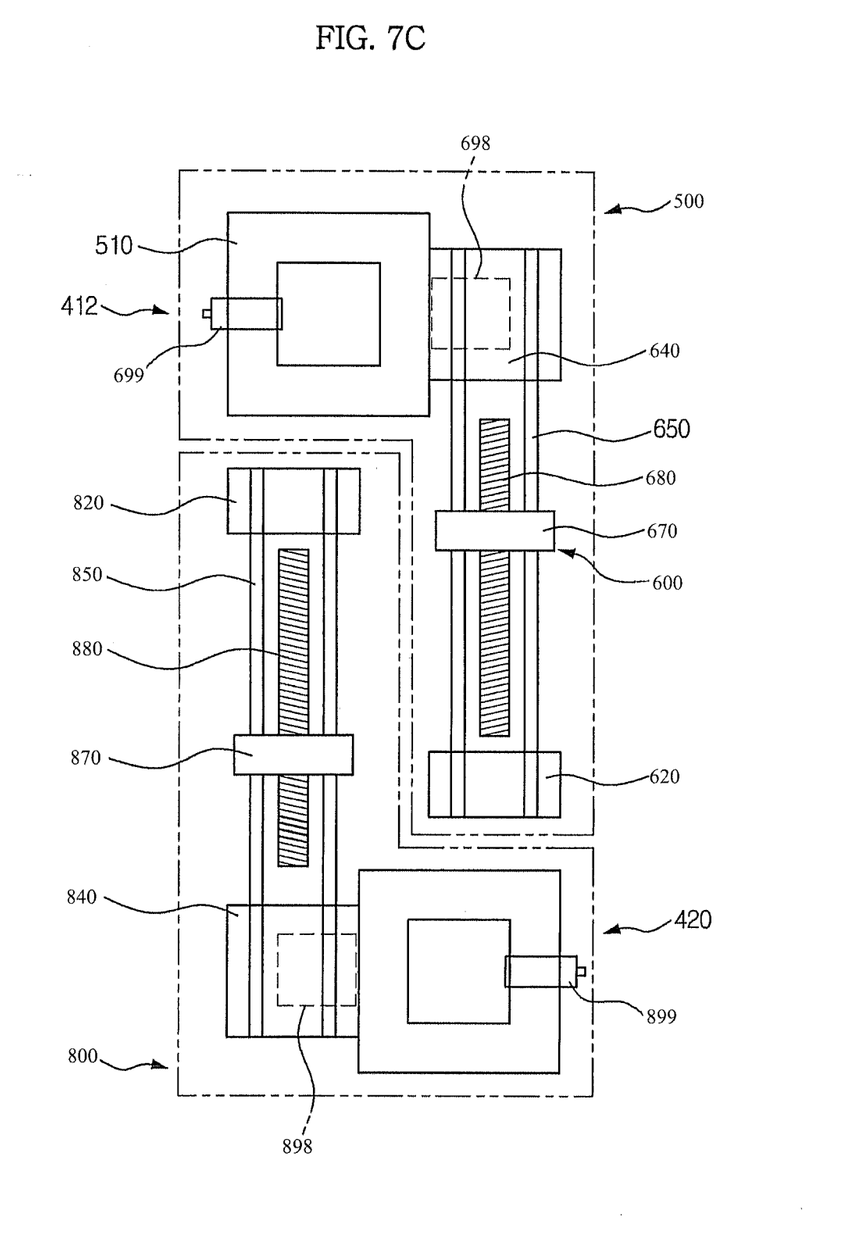
FIG. 7C is a conceptual view simplified from FIG. 7B.

FIG. 7A is a perspective view illustrating the hip joint unit and the knee joint unit, FIG. 7B is a front view of FIG. 7A, and FIG. 7C is a conceptual view simplified from FIG. 7B.

As shown in FIG. 7A to 7C, a hip joint unit driving device assembly 500 to drive the hip joint unit 412 and a knee joint unit driving device 800 to drive the knee joint unit 420 are arranged on the thigh link 41.

The hip joint unit driving device assembly 500 drives the hip joint unit 412 in two directions, i.e., the roll direction and the pitch direction. The hip joint unit driving device assembly 500 includes a frame 510, a tendon-type joint driving device 600 provided at one side of the frame 510 to rotate the hip joint unit 412 in the pitch direction, and a harmonic drive-type joint driving device 700 provided at the other side of the frame 510 to rotate the hip joint unit 412 in the roll direction.

The hip joint unit driving device assembly 500 utilizes the structure of the robot joint driving device assembly 500 shown in FIGS. 3A to 5. In the hip joint unit driving device assembly 500, the tendon-type joint driving device 600 provided at one side of the frame 510 rotates the hip joint unit 412 in the pitch direction, and the harmonic drive-type joint driving device 700 provided at the other side of the frame 510 rotates the hip joint unit 412 in the roll direction.

The knee joint unit driving device 800 utilizes the structure of the first joint driving device 600 of the robot joint driving device assembly 500 shown in FIGS. 3A to 5, and rotates the knee joint unit 420 in the pitch direction.

In the same manner as the first joint driving device 600, the hip joint unit driving device assembly 500 and the knee joint unit driving device 800 respectively include movable members 670 and 870, wires 650 and 850, idle pulleys 620 and 820, and joint parts 640 and 840.

Here, the hip joint unit driving device assembly 500 and the knee joint unit driving device 800 are arranged in one thigh link 41.

In the same manner as the first joint driving device 600, the hip joint unit driving device assembly 500 and the knee joint unit driving device 800 respectively further include torque sensors 698 and 898 to measure torques transmitted to the hip joint unit 412 and the knee joint unit 420 in the pitch direction, and a rotational angle sensor including 699 and 899 to measure angles of rotation of the hip joint unit 412 and the knee joint unit 420 in the pitch direction.

Hereinafter, a joint driving motion of the robot 1 in accordance with example embodiments will be described.

If the robot 1 wants to move respective joints, and robot 1 transmits a signal to respective joint driving devices through the control unit 12. For example, if the signal is transmitted to the hip joint unit 412, there will be a joint driving motion of the robot 1, which is further described below.

If the robot 1 wants to move the hip joint unit 412 in the pitch direction, the control unit 12 transmits a driving signal to a first driving motor (not shown) of the hip joint unit driving device assembly 500. When the first driving motor is rotated, rotary force of the first driving motor is transmitted to the movable member 670 via the ball screw part 680, and rectilinear motion of the movable member 670 rotates the hip joint part 640 in the pitch direction. In order to return the hip joint part 640 to its original state, the first driving motor is rotated in the reverse direction.

If the robot 1 wants to move the hip joint unit 412 in the roll direction, the control unit 12 transmits a driving signal to a second driving motor 710 of the hip joint unit driving device assembly 500. With reference to FIG. 5, when the second driving motor 710 is rotated, rotary force of the second driving motor 710 is transmitted to an output part 770 in a gear reduction method via a wave generator, a flex spline, and a circular spline. The rotation of the output part 770 results in rotation of the hip joint part 640 in the roll direction. In order to return the hip joint part 640 to its original state, the second driving motor 710 is rotated in the reverse direction.

Also in the knee joint unit 420 and other joint units, when the control unit 12 transmits a driving signal to respective driving motors, the respective driving devices are operated to move the corresponding joint units in desired directions.

As described above, the robot joint driving device assembly 500 and the robot 1 having the same, the tendon-type joint driving device and the harmonic drive-type joint driving device are properly arranged according to required motions and characteristics of respective joints, thereby assisting the robot 1 to conduct similar motions to those of humans.

Although the example embodiments describe the humanoid robot, the example embodiments may be applied to robots of other various types.

As is apparent from the above description, in a robot joint structure and a robot having the same in accordance with example embodiments, joint driving units are properly arranged according to motion characteristics of respective joints, thereby assisting the robot to conduct similar motions to those of humans.

Further, the robot has high rigidity and high precision.

The above-described embodiments may be recorded in computer-readable media including program instructions to implement various operations embodied by a computer. The media may also include, alone or in combination with the program instructions, data files, data structures, and the like, Examples of computer-readable media (computer-readable storage devices) include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although example embodiments have been shown and described, it should be appreciated by those skilled in the art that changes may be made in these embodiments without departing from the principles and spirit of the disclosure, the scope of which is defined in the claims and their equivalents.

What is claimed is:

1. A robot joint driving device assembly, comprising:
   a frame;
   a first joint driving device provided at one outer side of the frame to drive a robot joint unit in a first direction; and
   a second joint driving device provided at another outer side of the frame to drive the robot joint unit in a second direction perpendicular to the first direction,
   wherein the first joint driving device includes: a first driving motor movable in regular and reverse directions; a movable member moving rectilinearly according to rotation of the first driving motor by a belt, the movable member including at least one wire connection part, to which a wire unit is connected; the wire unit connected to both sides of the movable member; an idle pulley rotatably provided at one side of the wire unit; and a joint part provided at another side of the wire unit, and
   wherein the at least one wire connection part includes at least one wire passage hole, into which the wire unit is inserted, and at least one wire coupling hole to fix the wire unit to the movable member by at least one coupling pin.

2. The robot joint driving device assembly according to claim 1, wherein the first joint driving device further includes:
   an adjustment unit to adjust tension of the wire unit.

3. The robot joint driving device assembly according to claim 1, wherein the first joint driving device further includes a ball screw part, to which the movable member is screw-connected, the ball screw part receiving rotary force from the belt connected to the first driving motor.

4. The robot joint driving device assembly according to claim 3, wherein the ball screw part is connected with the first driving motor and is rotated according to driving of the first driving motor.

5. The robot joint driving device assembly according to claim 1, wherein the second joint driving device includes:
   a second driving motor;
   an input shaft connected to the second driving motor;
   an oval wave generator connected to the input shaft;
   a flex spline connected with an output part, having teeth formed on some portions thereof, and installed at an outside of the wave generator; and
   a circular spline having teeth formed therein to receive the flex spline while engaging with the flex spline.

6. The robot joint driving device assembly according to claim 5, wherein the second joint driving device further includes a rotational angle sensor to measure an angle of rotation of a robot joint.

7. The robot joint driving device assembly according to claim 1, wherein each of the first joint driving device and the second joint driving device includes a torque sensor to measure torque applied to each robot joint.

* * * * *